United States Patent [19]

Salisbury

[11] Patent Number: 4,584,159
[45] Date of Patent: Apr. 22, 1986

[54] PLASMA WAVE DAMPING SYSTEM AND METHOD

[75] Inventor: Winfield W. Salisbury, Scottsdale, Ariz.

[73] Assignee: Energy Profiles, Inc., Newtown Square, Pa.

[21] Appl. No.: 434,597

[22] Filed: Oct. 15, 1982

Related U.S. Application Data

[63] Continuation of Ser. No. 76,451, Sep. 17, 1979, abandoned.

[51] Int. Cl.$^4$ .............................................. G21B 1/02
[52] U.S. Cl. .................................... 376/107; 376/139; 174/117 R
[58] Field of Search ............... 376/126, 107, 139–141; 174/117 R

[56]  References Cited

U.S. PATENT DOCUMENTS

| | | | |
|---|---|---|---|
| 3,014,857 | 12/1961 | Gow et al. | 376/141 |
| 3,021,272 | 2/1962 | Baker et al. | 376/141 |
| 3,039,014 | 6/1962 | Chang . | |
| 3,096,269 | 7/1963 | Halbach et al. . | |
| 3,101,310 | 8/1963 | Post . | |
| 3,132,996 | 5/1964 | Baker et al. | 376/141 |
| 3,166,477 | 1/1965 | Leboutet . | |
| 3,189,523 | 6/1965 | Patrick . | |
| 3,445,333 | 5/1969 | Lecomte . | |
| 3,462,622 | 8/1969 | Cann et al. . | |
| 3,527,977 | 9/1970 | Ruark . | |
| 3,617,908 | 11/1971 | Greber | 376/139 |
| 3,663,858 | 5/1972 | Lisitano . | |
| 3,733,248 | 5/1973 | Hendel et al. . | |
| 4,068,147 | 1/1978 | Wells . | |

FOREIGN PATENT DOCUMENTS

| | | |
|---|---|---|
| 925508 | 5/1963 | United Kingdom . |
| 1080844 | 9/1967 | United Kingdom . |

OTHER PUBLICATIONS

Ladikov & Samoilenko; Magnetic Feedback Stabilization in a Tokamak, Soviet Physics–Technical Physics; vol. 17, No. 10; Apr. 1972; pp. 1644–1650.

Van Nostrants' Scientific Encyclopedia; article on "Accelerator (Particle)"; pp. 13–18.

Willis W. Harman; Fundamentals of Electronic Motion; 1953; pp. 161–162.

*Primary Examiner*—Harvey E. Behrend
*Attorney, Agent, or Firm*—Richards, Harris, Medlock & Andrews

[57]  ABSTRACT

In a fusion reaction system where ions from two sources travel along helical paths toward each other in opposite senses and directions at a common radius in a cylindrical reaction zone, electrically conductive coil means are formed as a helix and placed in the zone whereby coupling of spontaneous space charge waves and helical coils is damped.

15 Claims, 5 Drawing Figures

PLASMA WAVE DAMPING SYSTEM AND METHOD

This is a continuation of application Ser. No. 076,451 filed Sept. 17, 1979, now abandoned.

TECHNICAL FIELD

This invention relates to a method and system for damping and suppressing plasma waves in positively charged oppositely directed particle beams in a directed particle reactor.

BACKGROUND ART

In applicant's U.S. Pat. Nos. 4,397,809 and 4,397,810 an atomic fusion process is disclosed wherein two oppositely directed streams of ions are forced to follow the same spiral paths in the same reaction zone for promoting fusion producing collisions between particles of one stream and particles of the other stream. By way of example, the streams may comprise deuterium and helium 3 ions, respectively.

The reaction zone comprises an annulus between an inner cylindrical electrode and an outer cylinderical electrode between which a radial electric field is established to control and maintain the streams in the spiral path.

Where two such beams of positively charged particles move in opposite directions along such spiral path, the statistical effect of multiple coulomb scattering may produce waves of plasma-density and/or plasma boundary position. Under some conditions, such waves may have amplifying or growing properties. Growing or amplified waves can reach amplitudes which allow the particle beams to break out of the constraints provided by the system, and so lose fuel and energy from the reactor. For certain fuel combinations, the nuclear cross sections are undesirably small compared to the statistical coulomb scattering cross section. As a result, scattering waves, if not controlled or damped out, could prevent efficient operation of the reactor. If is therefore desirable to provide a damping system to prevent the occurrence and/or growth of such waves at their possible inception.

DISCLOSURE OF THE INVENTION

Energy absorption resulting in damping or rejection of waves produced as a statistical result of opposing-stream coulomb scattering is provided electrically by means of spiral electrode means, supported along the coaxial space is which a radial electric field is established for achieving particle confinement. Preferably, both inner and outer spiral electrodes are used. The spiral electrodes are connected to resistance loads which match the electrodes in characteristic impedance. By this means, the absorption of any incipient wave energy by coupling to the wave fields will in general prevent the starting of such waves. Matching the spiral element impedance to the resistance load will result in absorption of fields due to beam expansion so as to prevent amplification or growth of the waves. Absorbing resistances of vanishing small inductance can produce damping over such a broad frequency band that no vaves larger than normal thermal noise level waves will occur and essentially no power load dissipation will be required of the load resistor.

Inner and outer spiral electrodes preferably have approximately the same pitch as the spiral path followed by the particle beams. Such spiral electrodes may also provide the confining radial electrical field with minimum possibility of radial electric field breakdown, even at high beam currents which require high electric field strengths. The electrodes may serve either passively or actively.

Thus there is provided improvement in a fusion reaction system wherein ions from two sources are forced to travel in opposite senses in a cylindrical reaction zone. Electrically conductive spiral coil means are mounted at at least one of the inner boundaries of the reaction zone and the outer boundary of the reaction zone.

Electrical terminal means is provided for coil means, having resistance about equal the characteristic impedence of the coil means when in place in the reaction zone.

DETAILED DESCRIPTION

FIG. 1

Figure 1:
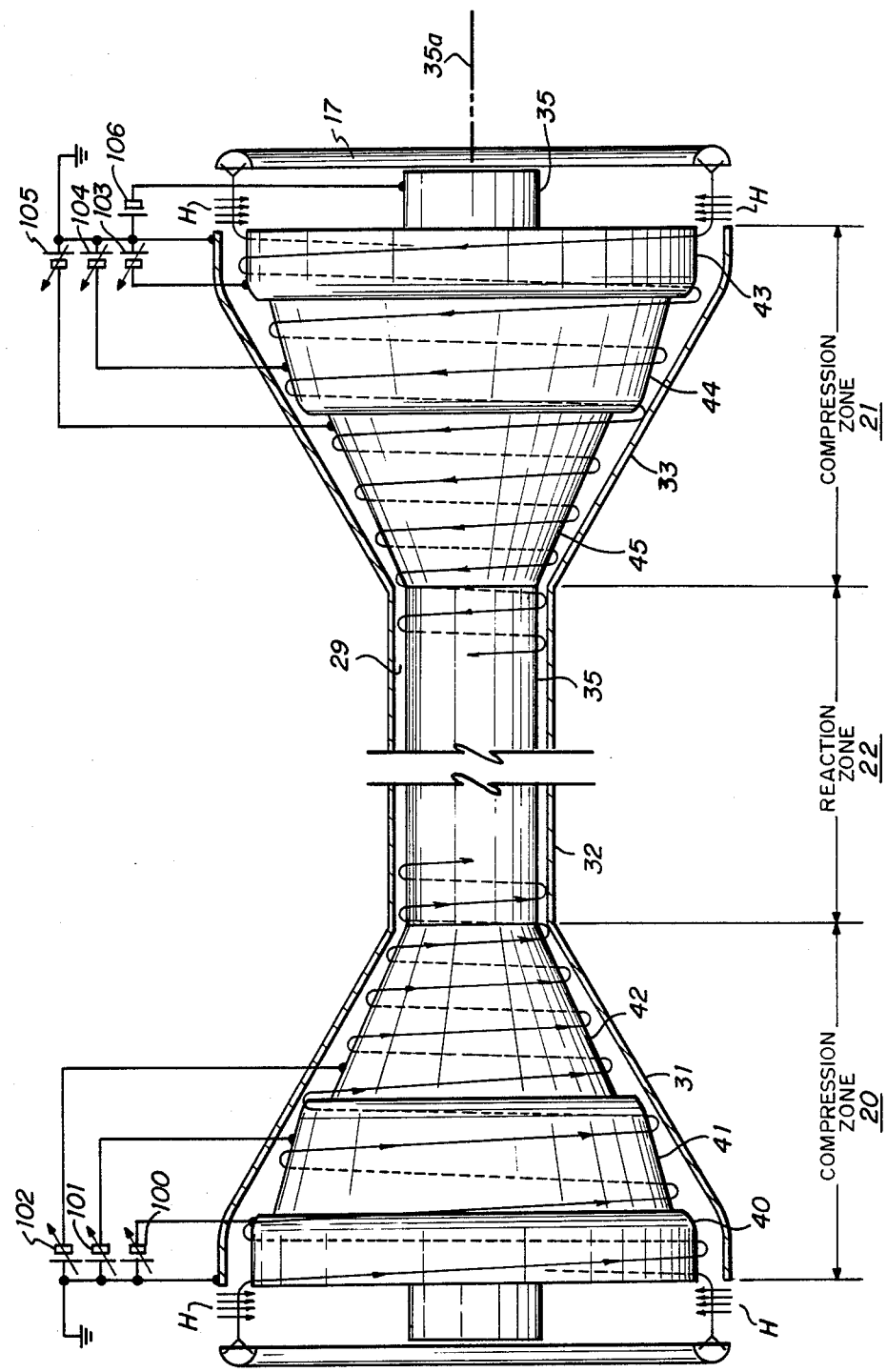
FIG. 1 is a sectional view of a reactor in which the invention is employed.

As described in U.S. Pat. Nos. 4,397,809 and 4,397,810, FIG. 1 comprises two ion sources 16 and 17 which face each other. Ion beams from sources 16 and 17 are accelerated parallel to a common reaction zone axis 35a. The beams each pass through a radial magnetic field H. The magnetic field forces the ions into spiral paths about axis 35a. Ions from source 16 travel in one direction and ions from source 17 travel in the other direction. same spiral path. The spiraling beams are then subjected to electrostatic fields which cause progressive decrease in the radii of the spiral paths and compression of the beams. More particularly, housing 31, 32, 33 is at a reference potential. Conical electrode 40 is at a negative potential as provided by DC source 100. Conical electrode 41 is at a negative potential as provided by DC source 101. Conical electrode 42 is at a negative potential as provided by DC source 102. Similarly, the potentials on electrodes 43–45 and on tubes 35 are established from sources 103–106, respectively. After compression, the beams enter an annular reaction chamber 29 in which ions in the beam from source 16 travel in collision courses with respect to ions in the beam from source 17.

If the ions from source 16 are deuterium ions and ions from the source 16 are helium 3 ions, then the following well known reaction takes place:

$$^2D + {}^3He \rightarrow {}^4He + p + 18.3 \text{ MeV} \tag{1}$$

Two particles result, i.e., a helium atom and a proton, plus 18.3 MeV of energy. the particles at such energy no longer are confined by the field and, thus, may escape to impinge the chamber wall. The energy is then absorbed at the boundaries of the reaction chamber 29. Heat may then be extracted through use of suitable heat exchangers.

Electric fields applied in the compression zones 20 and 21, FIG. 1, are such as to force the ions into very thin highly compressed dense beams which travel at a predetermined pitch or grade in chamber 29. Thus, each ion makes a plurality of cycles of rotation as it traverses reaction zone 22, with collisions resulting in fusion of the colliding particles.

The spaces in which the ions are generated, compressed and reacted are evacuated. The electric fields in compression zone 20 and compression zone 21 are so tailored as to cause the two beams to follow the same helical paths through the reaction chamber 29. The paths shown in FIG. 1 have been shown as having a very coarse pitch. It is to be understood that this is solely for the purpose of illustration. In actual practice the pitch would be such that in the reaction chamber 29 there would be many passes of ions in one beam as it passes through the other at the same radius. As shown, the reaction chamber 29 is of circular symmetry at any given cross-section perpendicular to the axis of said paths and is bounded by spaced apart outer and inner walls.

The electric fields between the outer shell 31, 32, 33 and the various electrodes are tailored in compression zones 20 and 21 to provide a gradual decrease in the diameter of the spiral paths as the beams travel from sources 16 and 17 to the points where they enter the reaction chamber 29. More or fewer discrete compression fields may be imposed on the ion beam. The specific configuration will depend upon particular design desired.

Figure 2:
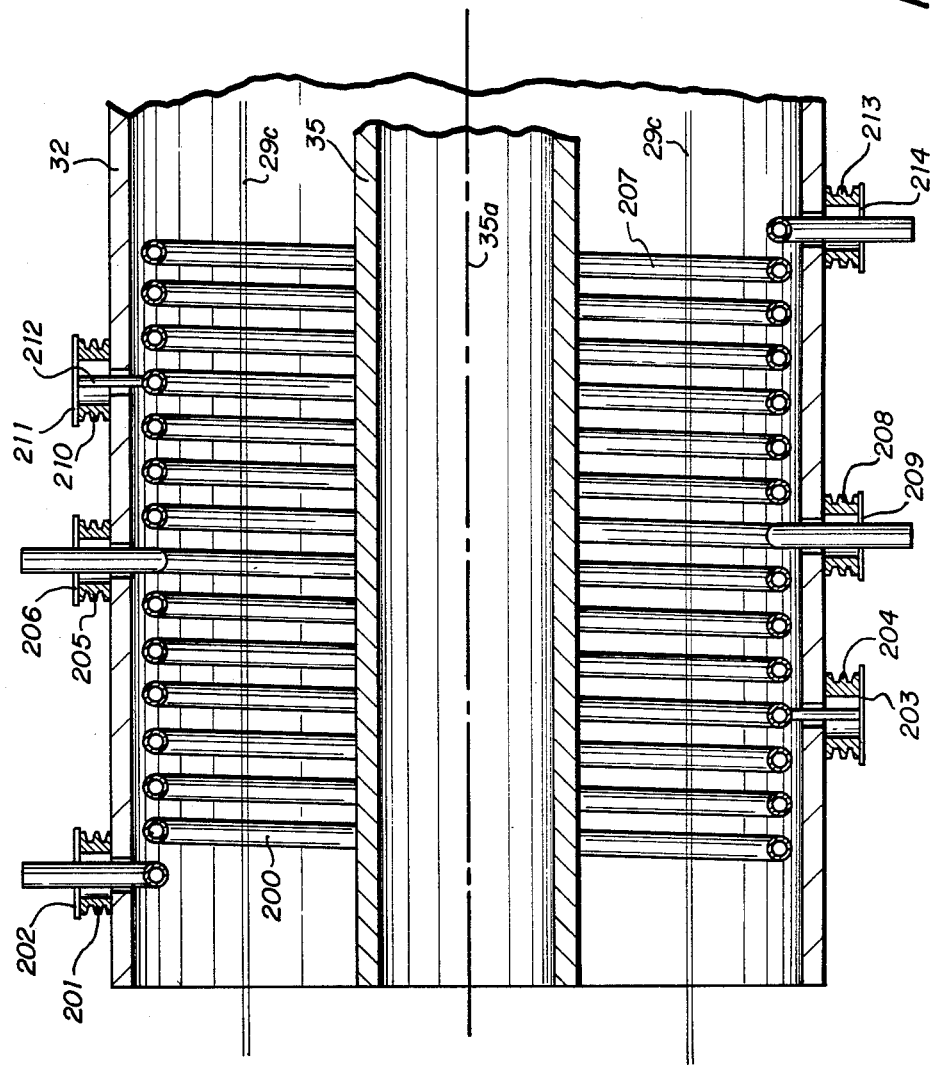
FIG. 2 is a sectional view of a portion of the reactor of FIG. 1 in which compressor coils are provided at the outer wall.

FIGURE 2 In accordance with the present invention, the reaction chamber 29 is provided with one or more suppressor coils suitably electrically terminated so that they may serve to damp unwanted or undesirable waves in the system. In FIG. 2, the outer wall 32 has been shown in section and the inner electrode 35 is shown in section, with both tubes symmetrical to the central axis 35a. In the embodiment of FIG. 2 a set of outer suppressor coils is provided wherein the hollow coil 200 passes through the wall of cylinder 32 into chamber 29.

The material forming coil 200 is of conductive character and the coil is tubular. It is supported by insulator 201 and disc 202 and at an intermediate point by disc 203 mounted on an insulator 204. At the opposite end, coil 200 passes out through an insulator 205 where it is supported by disc 206. A second coil 207 enters chamber 29 by passing through insulator 208 which supports disc 209. An intermediate support is provided by insulator 210 and disc 211 which supports a rod 212. The opposite end of coil 207 passes out of the chamber 29 through insulator 213, which supports disc 214.

In accordance with the present invention, the coils 200 and 207 and any additional coils that may be employed in tandem with coils 200 and 207 preferably have the same pitch and extend axially in the same direction as the particles move in the reaction zone 29.

For the purpose of the present description, it is to be understood that the shaded area 29c represents a thin, highly compressed, dense band of orbiting particles, where some of the particles move from left to right from one of the sources of FIG. 1, and others of the particles move from right to left from the other of the sources of FIG. 1. They occupy the same space so that collisions are promoted.

The resultant release of energy due to fusion of ions, such as deuterium and helium 3, is extracted in this embodiment of the invention through the flow of a coolant fluid through coils 200 and 207 and any additional coils present, as well as extractions of heat from the walls of cylinders 32 and 35. While the coils 200 and 207 have been shown supported in chamber 29 by discs 202, 203, 206, 209, 211 and 214, it is to be understood that the coils may be bonded to the inner walls of cylinder 32 by means of ceramic material of low atomic weight, such as alumina or beryllia. The use of such light atomic weight material minimizes the lifetime of any radioactive elements that might be produced by the bombardment of high energy products of the atomic fusion energy release process.

FIGURE 3

Figure 3:
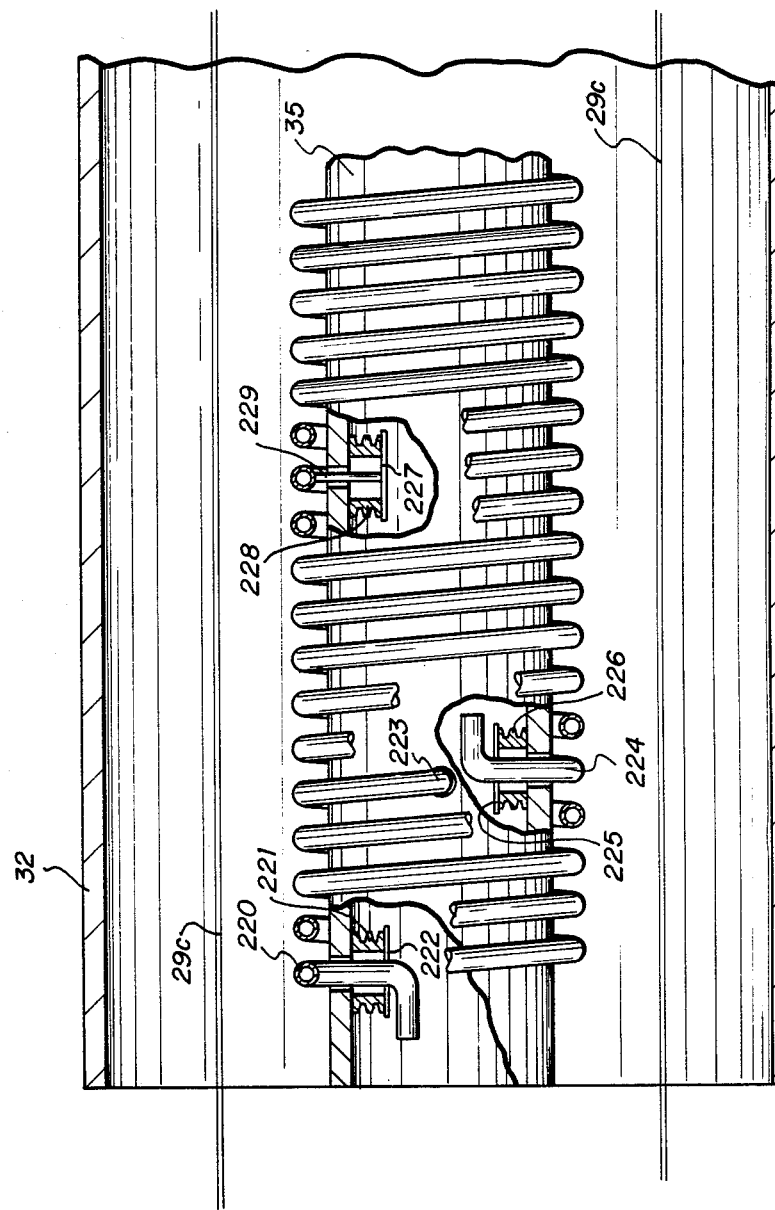
FIG. 3 is a sectional view of the reaction zone of FIG. 1 in which suppressor coils are provided on the inner walls.

FIG. 3 illustrates the mounting of inner wall suppressor coils in such a manner that they extend around the outer surface of the inner cylinder 35. In this embodiment, coil 220 enters the reaction zone through an insulator 221 and supporting disc 222. At the opposite end, coil 220 passes out of reaction chamber 29 at point 223 through support and insulating means, not shown. A second coil 224 enters the reaction chamber 29 by passing through supporting disc 225 and insulator 226. Coil 224 is supported at an intermediate point by support disc 227 mounted on insulator 228 and supporting the post 229. The opposite end of coil 224 then passes from reaction chamber 29 through mounting means (not shown) similar to those at the entry point. The spiral pitch of coils 220 and 224 preferably is the same as that of coils 200 and 207 of FIG. 3, and preferably the same pitch as the spiral path of particles in the cylindrical path 29c.

FIGURE 4

Figure 4:
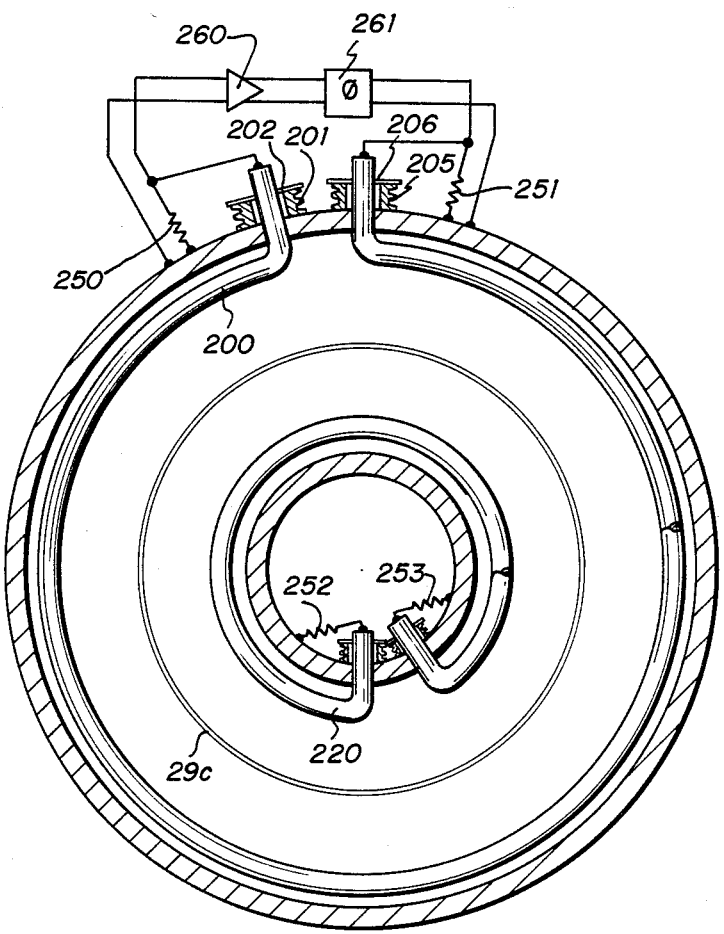
FIG. 4 is a sectional view taken along lines 4—4 of FIGS. 2 and 3.

The outer suppressor coils of FIG. 2 and the inner suppressor coils of FIG. 3 have been shown separately. It is to be understood that in practice they may be used either separately or in combination. In either case, it will be preferred that the coils be terminated in a resistive termination of impedence, preferably equal to characteristic impedance of the given coil as it is mounted in chamber 29. Such terminations are shown in FIG. 4. In FIG. 4, the outer cylinder 32 and the inner cylinder 35 are shown in section with the extremities of coil 200 being supported by discs 202 and 206 through insulators 201 and 205, respectively. As shown, the end of coil 200, supported by disc 202, is connected by way of a resistive termination element 250 to the outer surface of the outer cylinder 32. The end supported by disc 206 similary is terminated by a resistive element 251 to the outer surface of the cylinder 32. In a similar manner, the ends of coil 220 are terminated to the inner wall of cylinder 35 by resistive element 252 and inner wall of cylinder 35 by resistive element 252 and 253. By reason of the characteristic impedance termination, the presence of the coil causes damping of any waves that may appear in the flow of positively charged ions.

In order to provide more accurate control and even more positive action in damping out undesirable waves in the system, the coils can be made to operate in an active mode rather than in a passive mode. In such case, the voltages developed across the terminating resistence 250 or 251, for example, may be sampled for incipient waves by a broad band amplifier 260, the inputs to which are connected across resistor 250. The output of amplifier 260 then is applied to a suitable phase shift unit 261. The output is then fed back into coil 200 by connecting the output of the phase shift unit 261 across the terminating impedence 251. The phase and amplitude of this feedback signal may be controlled by a suitably programmed miniature computer so as to continually minimize any wave output into the matching resistance loads on the coiled electrodes.

A similar provision can be made for the coils, such as coil 200, on the inner electrode 35.

Figure 5:
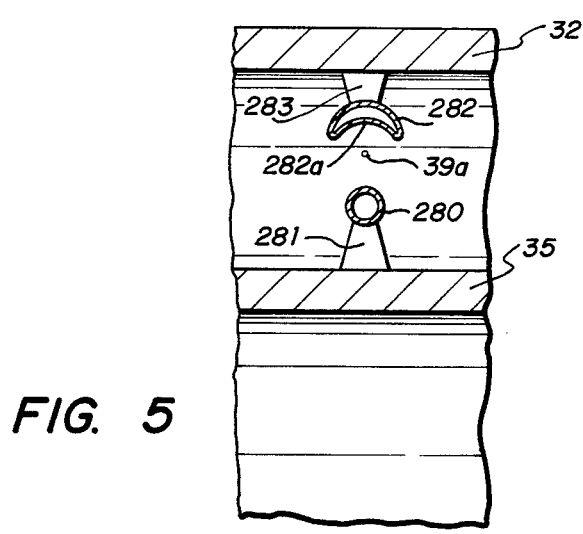
FIG. 5 illustrates a modification of the coils of FIGS. 2-4.

FIGURE 5 As noted, the coiled electrodes preferably have the same pitch and direction as the beams 29c are constrained to follow. In such case, the spiral electrodes can be shaped to provide radial continuous confining electric fields required for beam focusing. That is, the surfaces of the coil can be so shaped that the outer surfaces of the inner spiral electrodes are convex toward the beam space and the inner surface of the outer electrodes are concave. The resultant confining radial electric field is given a component focusing the beams axially and confining them to individual spiral paths. Such a configuration is shown in FIG. 5, where one turn of the inner coil 280 is shown mounted from the surface of the inner cylinder 35 by suitable mounting structure 281. The outer surface of the turn 280 is convex. In contrast, the portion of the outer electrode 282 is shown mounted in the outer cylinder 32 by a support structure 283. The inner surface 282a of the electrode 282 is concave, thus tending to constrain the particles traveling in the path 39a to be concentrated along the direction of the axis 35a. Thus, if the pitch of the coils is the same as the pitch of the spiral path of the particles and the turns of the inner and outer coils are located as to be in radial facing relation, then the axial concentration or bunching further enhances the probability of fusion producing collisions.

Having described the invention in connection with certain specific embodiments thereof, it is to be understood that further modifications may now suggest themselves to those skilled in the art, and it is intended to cover such modifications as fall within the scope of the appended claims.

I claim:

1. In a fusion reaction system where positive ions from two sources are to spiral toward each other in a radial D.C. electric field on a common axis while rotating in opposite senses in orbital paths of common radii in an annular reaction zone of circular symmetry at any given cross-section perpendicular to the axis of said paths and bounded by spaced apart outer and inner coaxial electrode walls for promoting collisions of ions in one beam with ions in the other beam, the improvement comprising:
    (a) electrically conductive coil means formed as a helix in said zone adjacent to at least one of said inner and outer walls of said zone, and
    (b) electrical terminal means for said coil means, having resistance about equal the characteristic impedance of said coil means, said coil means having a spiral pitch determined by said spiral of said ion beams wherein the pitch of said coils is substantially the same as the pitch of the spiral paths of the ions in said ion beams for effectively coupling spontaneous space charge waves in said reaction zone with said coils for damping.

2. The system of claim 1 wherein said conductive coil means extend along the inner wall.

3. The system of claim 1 wherein said conductive coil means extend along the inner wall.

4. The system of claim 1 wherein said conductive coil means extend along the outer wall and the inner wall.

5. In a fusion reaction system where positive ions from two sources are to spiral toward each other in a radial D.C. electric field on a common axis while rotating in opposite senses in orbital paths of common radii in an annular reaction zone of circular symmetry at any given cross-section perpendicular to the axis of said paths and bounded by spaced apart outer and inner coaxial electrode walls for promoting collisions of ions in one beam with ions in the other beam, the improvement comprising:
    electrically conductive coil means formed in a helix in said zone adjacent to said inner wall of said zone and electrically conductive coil means in said zone adjacent to said outer wall of said zone and in the same pitch as the paths followed by said ions, and
    electrical terminal means for each said coil means, each having resistance about equal the characteristic impedances of said coil means, said coil means having a spiral pitch determined by said spiral of said ion beams wherein the pitch of said coils is substantially the same as the pitch of the spiral paths of the ions in said ion beams for effectively coupling spontaneous space charge waves in said reaction zone with said coils for damping.

6. In a fusion reaction system where positive ions from two sources are to spiral toward each other in a radial D.C. electric field on a common axis while rotating in opposite senses in orbital paths of common radii in an annular reaction zone of circular symmetry at any given cross-section perpendicular to the axis of said paths and bounded by spaced apart outer and inner coaxial electrode walls for promoting collisions of ions in one beam with ions in the other beam, the improvement comprising:
    placing electrically conductive coil means formed as a helix in said zone adjacent to the inner wall of said zone and electrically conductive coil means in a helix adjacent to the outer wall of said zone, and
    electrically terminating each said coil means, each by resistance about equal the characteristic impedances of said coil means, said coil means having a spiral pitch determined by said spiral of said ion beams wherein the pitch of said coils is substantially the same as the pitch of the spiral paths of the ions in said ion beams for effectively coupling spontaneous space charge waves in said reaction zone with said coils for damping.

7. In a fusion reaction system where positive ions from two sources are to spiral toward each other in a radial D.C. electric field on a common axis while in an annular reaction zone of circular symmetry at any given cross-section perpendicular to the axis of said paths and bounded by spaced apart outer and inner coaxial electrode walls for promoing collisions of ions in one beam with ions in the other beam, the improvement comprising:
    electrically conductive coil means formed as a helix in said zone adjacent to at least one of the inner walls of said zone and the outer wall of said zone said coil means having a spiral pitch determined by said spiral of said ion beams wherein the pitch of said coils is substantially the same as the pitch of the spiral paths of the ions in said ion beams for coupling with waves in said ion beams and electrically terminated to said walls of said zone for damping waves in said beams wherein said electrically terminating is by resistance about equal the characteristic impedance of said coil means.

8. The system of claim 7 wherein said conductive coil means extend coaxially along the outer wall.

9. The system of claim 7 wherein said conductive coil means extend coaxially along the inner wall.

10. The system of claim 7 wherein said conductive coil means extend coaxially along the outer wall and the inner wall.

11. In a fusion reaction system wherein streams of positive ions travel along helical paths toward each other in opposite senses and directions confined at a common radius by a continuous D.C. radial electrical field in a cylindrical reaction zone bounded by spaced apart outer and inner electrical walls, the improvement comprising:
   (a) electrically conductive coil means helically disposed within said zone at the inner wall of said zone and electrically conductive coil means helically disposed within said zone at the outer wall of said zone and at the same pitch and sense as the paths followed by said ions,
   (b) electrical terminal means for each said coil means, each having resistance about equal the characteristic impedances of said coil means when in place in said zone, and
   (c) a feedback loop for sensing variations in voltage across at least one of said impedances, amplifying the same and applying the amplified voltage to at least one of said coil means, said coil means having a spiral pitch determined by said spiral of said ion streams wherein the pitch of said coils is substantially the same as the pitch of the helical paths of the ions in said ion streams for effectively coupling of spontaneous space charge waves in said reaction zone with said coils for damping.

12. The system of claim 11 wherein an amplifier and phase control are provided in said loop.

13. In a fusion reaction system where positive ions from two sources are to spiral toward each other in a radial D.C. electrical field on a common axis while rotating in opposite senses in orbital paths of common radii in an annular reaction zone of circular symmetry at any given cross-section perpendicular to the axis of said paths and bounded by spaced apart outer and inner coaxial electrode walls for promoting collisions of ions in one beam with ions in the other beam, the improvement comprising:
   (a) supporting electrically conductive coil means in a helix spaced within said zone from at least one of the inner walls of said zone and the outer wall of said zone said coil means having a spiral pitch determined by said spiral of said ion beams wherein the pitch of said coils is substantially the same as the pitch of the spiral paths of the ions in said ion beams to effectively couple with beam space charge waves in said zone,
   (b) electrically terminating each said coil means, each by resistance about equal the characteristic impedance of said coil means,
   (c) sensing voltage variation across at least one said impedance due to said waves in said beams,
   (d) amplifying said voltage, and
   (e) applying the amplified voltage to at least one of said coil means in such phase as to damp said waves.

14. In a fusion reaction system where positive ions from two sources are to spiral toward each other in a radial D.C. electrical field on a common axis while rotating in opposite senses in orbital paths of common radii in an annular reaction zone of circular symmetry at any given cross-section perpendicular to the axis of said paths and bounded by spaced apart outer and inner coaxial electrode walls for promoting collisions of ions in one beam with ions in the other beam, the improvement comprising:
   (a) supporting an inner electrically conductive helical coil in said zone adjacent to but spaced from the inner walls of said zone,
   (b) supporting an outer conductive helical coil in said zone adjacent to but spaced from the outer wall of said zone,
   (c) each of said coils having a spiral pitch determined by said spiral of said ion beams wherein the pitch of said coils is substantially the same as the pitch of the spiral paths of the ions in said ion beams for effectively coupling space charge waves in said beams with each of said coils,
   (d) electrically terminating each of said coils by resistive elements, each having a resistance about equal to the characteristic impedance of said coils,
   (e) sensing voltage variations across at least one of said resistive elements due to said waves in said beams,
   amplfying said voltage, and
   (g) applying the amplified voltage to at least one of said coils in such phase as to damp said waves.

15. The combination set forth in claim 4 in which the coil means on one side of said path is convex and the surface of the coil means on the opposite side of said path is concave.

* * * * *

UNITED STATES PATENT AND TRADEMARK OFFICE
CERTIFICATE OF CORRECTION

PATENT NO. : 4,584,159
DATED : Apr. 22, 1986
INVENTOR(S) : Salisbury

It is certified that error appears in the above-identified patent and that said Letters Patent is hereby corrected as shown below:

Column 1, line 64 "vaves" should be --waves--.

Column 2, line 43 delete "same spiral path."

Column 2, line 52 "tubes" should be --tube--.

Column 2, line 65 "the" should be --The--.

Column 3, line 35 "FIGURE 2" should be centered.

Column 3, line 56 "214." should not be centered.

Column 4, line 59 delete "inner wall of cylinder 35 by resistive element 252 and"

Column 5, line 14 "FIGURE 5" should be centered.

Column 5, line 26 "turn of" should be --turn on--.

Column 8, line 47 before "amplfying" insert --(f)--.

Signed and Sealed this

Seventh Day of October, 1986

[SEAL]

Attest:

DONALD J. QUIGG

Attesting Officer

Commissioner of Patents and Trademarks